(12) United States Patent
Lindström et al.

(10) Patent No.: US 9,771,059 B2
(45) Date of Patent: Sep. 26, 2017

(54) METHOD OF SUPPLYING ELECTRICAL APPLIANCES OF A VEHICLE

(71) Applicant: Scania CV AB, Södertälje (SE)

(72) Inventors: Johan Lindström, Nyköping (SE);
Mathias Björkman, Tullinge (SE);
Mikael Bergquist, Huddinge (SE);
Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/106,808

(22) PCT Filed: Dec. 23, 2014

(86) PCT No.: PCT/SE2014/051570
§ 371 (c)(1),
(2) Date: Jun. 20, 2016

(87) PCT Pub. No.: WO2015/099600
PCT Pub. Date: Jul. 2, 2015

(65) Prior Publication Data
US 2017/0001631 A1    Jan. 5, 2017

(30) Foreign Application Priority Data
Dec. 23, 2013    (SE) ...................................... 1351574

(51) Int. Cl.
*B60W 20/00* (2016.01)
*B60K 6/365* (2007.10)
(Continued)

(52) U.S. Cl.
CPC ............... *B60W 20/00* (2013.01); *B60K 1/02* (2013.01); *B60K 6/365* (2013.01); *B60K 6/387* (2013.01);
(Continued)

(58) Field of Classification Search
CPC ............... B60W 20/00; B60W 10/115; B60W 30/18009; B60K 6/365; F02D 41/3005
See application file for complete search history.

(56) References Cited

U.S. PATENT DOCUMENTS 5,433,282 A    7/1995  Moroto et al.
5,508,574 A    4/1996  Vlock
(Continued)

FOREIGN PATENT DOCUMENTS

DE    19628000 A1    1/1997
DE    19838853 A1    3/1999
(Continued)

OTHER PUBLICATIONS

Written Opinion of the International Search Authority for PCT/SE14/051570 dated Apr. 30, 2015.
(Continued)

*Primary Examiner* — Basil T Jos
(74) *Attorney, Agent, or Firm* — Moore & Van Allen PLLC; W. Kevin Ransom

(57) ABSTRACT

Disclosed is a method for control of a vehicle with a drive system comprising an output shaft in a combustion engine and a planetary gear with a first and a second electrical machine connected via their rotors to the components in the planetary gear, a supply of electrical power to electrical auxiliary units and/or loads present in the vehicle is carried out, by way of the combustion engine being kept running with its output shaft connected with the second electrical machine's rotor, and the electrical auxiliary units and/or loads being supplied with electrical power via the first electrical machine and/or the second electrical machine.

12 Claims, 5 Drawing Sheets

(51) Int. Cl.

| | | |
|---|---|---|
| B60W 10/115 | (2012.01) | |
| B60W 30/18 | (2012.01) | |
| F02D 41/30 | (2006.01) | |
| B60K 1/02 | (2006.01) | |
| B60K 6/387 | (2007.10) | |
| B60K 6/40 | (2007.10) | |
| B60W 10/02 | (2006.01) | |
| B60W 10/06 | (2006.01) | |
| B60W 10/08 | (2006.01) | |
| B60W 20/20 | (2016.01) | |
| B60K 6/46 | (2007.10) | |
| B60W 20/40 | (2016.01) | |
| B60W 20/15 | (2016.01) | |
| F16H 3/72 | (2006.01) | |
| F02D 41/06 | (2006.01) | |
| F02D 41/26 | (2006.01) | |
| B60K 6/44 | (2007.10) | |
| B60W 10/10 | (2012.01) | |
| B60W 20/30 | (2016.01) | |
| F02D 41/04 | (2006.01) | |
| B60W 10/12 | (2012.01) | |
| B60W 20/10 | (2016.01) | |
| B60K 6/547 | (2007.10) | |

(52) U.S. Cl.
CPC .......... *B60K 6/40* (2013.01); *B60K 6/44* (2013.01); *B60K 6/46* (2013.01); *B60W 10/02* (2013.01); *B60W 10/06* (2013.01); *B60W 10/08* (2013.01); *B60W 10/10* (2013.01); *B60W 10/115* (2013.01); *B60W 10/12* (2013.01); *B60W 20/10* (2013.01); *B60W 20/15* (2016.01); *B60W 20/20* (2013.01); *B60W 20/30* (2013.01); *B60W 20/40* (2013.01); *B60W 30/18* (2013.01); *B60W 30/181* (2013.01); *B60W 30/18009* (2013.01); *B60W 30/18027* (2013.01); *B60W 30/18109* (2013.01); *F02D 41/042* (2013.01); *F02D 41/062* (2013.01); *F02D 41/26* (2013.01); *F02D 41/3005* (2013.01); *F16H 3/728* (2013.01); *B60K 6/547* (2013.01); *B60W 2400/00* (2013.01); *B60W 2510/125* (2013.01); *B60W 2520/40* (2013.01); *B60W 2710/021* (2013.01); *B60W 2710/06* (2013.01); *B60W 2710/0644* (2013.01); *B60W 2710/081* (2013.01); *B60W 2710/083* (2013.01); *B60W 2710/105* (2013.01); *B60W 2710/1038* (2013.01); *B60W 2710/125* (2013.01); *B60W 2710/248* (2013.01); *B60W 2710/30* (2013.01); *B60W 2710/305* (2013.01); *B60W 2720/40* (2013.01); *B60Y 2200/92* (2013.01); *B60Y 2300/18* (2013.01); *B60Y 2300/188* (2013.01); *B60Y 2300/18025* (2013.01); *B60Y 2300/18091* (2013.01); *B60Y 2300/19* (2013.01); *B60Y 2300/43* (2013.01); *B60Y 2300/60* (2013.01); *B60Y 2300/78* (2013.01); *B60Y 2300/84* (2013.01); *B60Y 2400/73* (2013.01); *Y10S 903/903* (2013.01); *Y10S 903/91* (2013.01); *Y10S 903/93* (2013.01); *Y10S 903/945* (2013.01)

(56) References Cited

U.S. PATENT DOCUMENTS

| | | | |
|---|---|---|---|
| 6,354,974 | B1 | 3/2002 | Kozarekar |
| 6,579,201 | B2 | 6/2003 | Bowen |
| 2007/0102209 | A1 | 5/2007 | Doebereiner |
| 2008/0081734 | A1 | 4/2008 | Duffy et al. |
| 2009/0145673 | A1 | 6/2009 | Soliman et al. |
| 2010/0099532 | A1* | 4/2010 | Cashen ............... B60K 6/365 475/5 |
| 2013/0102429 | A1 | 4/2013 | Kaltenbach et al. |
| 2013/0316865 | A1 | 11/2013 | Engström et al. |

FOREIGN PATENT DOCUMENTS

| | | |
|---|---|---|
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 19838853 B4 | 11/2013 |
| EP | 552140 A1 | 10/1995 |
| EP | 552140 B1 | 10/1995 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| FR | 2832356 A1 | 5/2003 |
| JP | 07135701 A | 5/1995 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 2008016357 A2 | 2/2008 |
| WO | 2012091659 A1 | 7/2012 |
| WO | 2013002707 A1 | 1/2013 |

OTHER PUBLICATIONS

International Search Report for PCT/SE2014/051570 dated Apr. 29, 2015.

* cited by examiner

METHOD OF SUPPLYING ELECTRICAL APPLIANCES OF A VEHICLE

CROSS-REFERENCE TO RELATED APPLICATIONS

This application is a national stage application (filed under 35 § U.S.C. 371) of PCT/SE2014/051570, filed Dec. 23, 2014 of the same title, which, in turn, claims priority to Swedish Application No. 1351574-7, filed Dec. 23, 2013; the contents of each of which are hereby incorporated by reference.

FIELD OF THE INVENTION

The present invention relates to a method for the control of a vehicle, and is particularly, but not exclusively, focused on the performance of such a method in motor vehicles in the form of wheeled commercial vehicles, especially heavy goods vehicles, such as trucks and buses. The invention thus relates to a method carried out in a hybrid vehicle, which, generally, is a vehicle that may be powered by a primary engine, e.g. a combustion engine, and a secondary engine, such as at least one electrical machine. The vehicle is suitably, but for the purposes of the present invention not necessarily, equipped with means for storage of electric energy, such as a battery or a capacitor for storage of electric energy, and control equipment to control the flow of electric energy between the means and the electrical machine. The electrical machine(s) may in such a case alternately operate as an engine or as a generator, depending on the vehicle's operating mode. When the vehicle decelerates, the electrical machine generates energy that may be stored, and the stored electric energy is used later for e.g. operation of the vehicle.

BACKGROUND OF THE INVENTION

Using a conventional clutch mechanism which disconnects the gearbox's input shaft from the combustion engine during a shifting process in the gearbox entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and the disadvantages associated therewith may be avoided. A vehicle with a drive system of this type constitutes prior art as set out in EP 1 319 546 and SE 536 329.

Certainly, a range of advantageous methods to control a vehicle with a drive system of the type described in SE 536 329 constitute prior art, however there is naturally a constant endeavor to improve the manner of controlling such vehicles, especially in certain specific operating situations.

SUMMARY OF THE INVENTION

The objective of the present invention is to show a method of the type defined above, which is in line with the above-mentioned endeavor. This objective is achieved according to the invention by providing a method for control of a vehicle with a drive system.

Having a drive system in a vehicle with a second electrical machine opens up a possibility for an improved behavior in a range of operational situations compared to prior art drive systems lacking such a design of the drive system. Such a constantly occurring operational situation in a vehicle of this type consists of supplying a vehicle's electrical auxiliary units and/or loads with electrical power, and achieving this in accordance with the invention, by way of continuous running of the combustion engine with its output shaft connected to the second electrical machine's rotor, and supplying the electrical auxiliary units and/or loads with electric power via the first electrical machine and/or the second electrical machine. The steps a) and b) are thus carried out in parallel, and by connecting the combustion engine a continuous supply of the electrical auxiliary units and loads may thus take place in all operating modes. This is normally not achieved with hybrid solutions having only one electrical machine.

According to one embodiment of the invention, the method is implemented with the first locking means in its locked position, and in step b) said electrical auxiliary units and/or loads are supplied with electrical power requested thereby and distributed between the first and the second electrical machine, in such proportions that the total power loss is minimized. Such loss minimization is naturally advantageous, and according to another embodiment of the invention the method is implemented with the first locking means in its locked position, and instep b) said electrical auxiliary units and/or loads are supplied with electrical power requested thereby, in substantially equal parts from the first and the second electrical machines. This is advantageous from a loss minimization perspective, since the torque per electrical machine is halved compared to if one electrical machine supplies all of the electrical power, and since the electrical machines' loss effects substantially scale toward the torque applied squared, this entails that losses in the electrical machines are halved. However, such a distribution (50/50) is potentially not optimal in case the two electrical machines have dimensions which differ considerably from each other, but efforts are still made to select said proportions with this optimal distribution in mind.

According to another embodiment of the invention the method is implemented with said first locking means in its release position, and the method also comprises the following steps:

c) engine speed control of the combustion engine to an operational point, which is selected by minimizing combustion engine losses together with losses in the electrical machines and losses in inverters, comprised in the vehicle's electrical systems for conversion of direct voltage to alternating voltage and vice versa, d) control of the second electrical machine for balancing of the electrical power transmitted to said electrical auxiliary units and/or loads and the first electrical machine, and e) control of the first electrical machine to achieve, throughout the progress of the entire method, a requested torque for transmission to said output shaft of the planetary gear, wherein steps c), d) and e) are carried out substantially in parallel. Naturally, the steps a) and b) are also carried out in parallel with these steps.

According to another embodiment of the invention a vehicle is controlled, which has a drive system that also comprises a second locking means that may be moved between a locked position in which the combustion engine's output shaft is locked together with the second electrical machine's rotor and said first component, and a release position in which the combustion engine's output shaft is disconnected from the second electrical machine's rotor and said first component is allowed to rotate independently of these, the second locking means being in said locked position at the performance of the method. Such second locking means facilitates the disconnection of the combustion engine from the planetary gear, when the vehicle is powered purely electrically.

According to another embodiment of the invention a vehicle is controlled, whose drive system also comprises at least one electric energy storage means, for exchange of electric power with the first and second electrical machine and said electrical auxiliary units and/or loads.

"Electrical energy storage means" as used in this document means an energy storage means with an electrical interface in relation to the first and second electrical machine of the drive system, but storage of energy does not have to be electrical. This entails that in addition to an electrical battery and capacitor, for example flywheels, other mechanical means and means for building up pressure, e.g. pneumatic or hydraulic means, may be considered.

According to another embodiment of the invention, supply of said electrical auxiliary units and/or loads is carried out with electrical power, so that power balance is achieved, wherein free selection, within the limitations generally specified for the drive system, of charge current to, or discharge current from electric energy storage means, and/or electric auxiliary units and/or loads occurs that may be present in the vehicle, in accordance with the prevailing operational situation in the vehicle.

According to another embodiment of the invention, where needed, the maintenance of power balance is temporarily waived while said supply is implemented.

According to another embodiment of the invention, the method is carried out in a vehicle with a said drive system, in which the planetary gear's sun wheel is said first component and the ring gear is said third component. By connecting the first electrical machine's rotor with the ring gear and the combustion engine's output shaft with the sun wheel a compact construction is achieved which is easy to fit into already existing spaces for powertrains (drive systems) with clutch mechanisms instead of planetary gears.

According to another embodiment of the invention the method is implemented in a vehicle with a gearbox having an input shaft, which is connected with said second output shaft in the planetary gear. Via the inventive method, the combustion engine may be started without any torque interruption, and with a potential for the driver of the vehicle to maintain or change the torque transmitted to the vehicle's powertrain.

The invention also relates to a computer program product, and an electronic control device.

Other advantageous features and advantages with the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
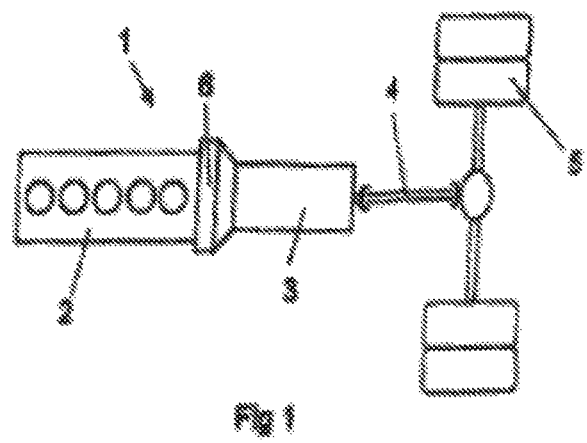
FIG. 1 is a very simplified view of a powertrain in a vehicle that may be equipped with a drive system for the performance of a method according to the invention.
Figure 2:
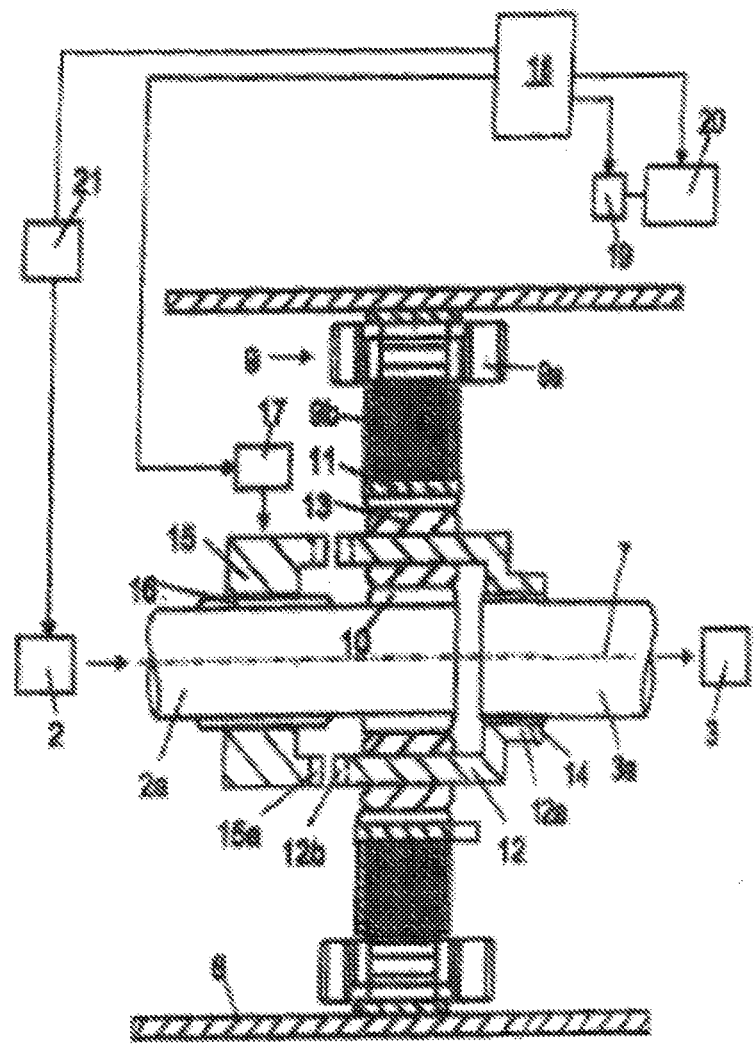
FIG. 2 is a more detailed, but still simplified view of a part of said drive system.

FIG. 1 shows a powertrain for a heavy goods vehicle 1. The powertrain comprises a combustion engine 2, a power transmission 3 in the form of for example a speed gearbox, a continuously variable transmission (CVT), or a direct transmission, a number of driving shafts 4 and driving wheels 5 Between the combustion engine 2 and the gearbox 3 the powertrain comprises an intermediate section 6. FIG. 2 shows a part of the components in the intermediate section 6 in more detail, more specifically those which also occur in prior art drive systems, such as the one according to SE 536 329. The combustion engine 2 is equipped with an output shaft 2a and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator-core which is fixed in a suitable manner on the inside of the house 8. The stator core comprises the stator's windings. The first electrical machine 9 is adapted, under certain operating circumstances, to use stored electrical energy to supply driving force to the input shaft 3a of the gearbox and under other operating conditions, to use the kinetic energy of the input shaft 3 of the gearbox to extract and store electric energy.

The planetary gear is arranged substantially radially inside of the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13 which are rotatably arranged in a radial space between the teeth of the sun wheel 10 and the ring gear 11. The sun wheel 10 is fixed on a peripheral surface of the combustion engine's output shaft 2a. The sun wheel 10 and the combustion engine's output shaft 2a rotate as one unit with a first rotational speed $n_1$. The planetary wheel carrier 12 comprises an attachment section 12a which is attached on a peripheral surface of the input shaft 3a of the gearbox with the help of a splines-joint 14. With the help of this joint, the planetary wheel carrier 12 and the gearbox's input shaft 3a may rotate as one unit with a second rotational speed $n_2$. The ring gear 11 comprises an external peripheral surface on which the rotor 9b is fixedly mounted. The rotor 9b and the ring gear 11 constitute one rotatable unit which rotates at a third rotational speed $n_3$.

The drive system comprises a first locking means since the combustion engine's output shaft 2a is equipped with a shiftable clutch element 15. The clutch element 15 is mounted on the combustion engine's output shaft 2a with the help of a splines-joint 16. The clutch element 15 is in this case arranged in a twist-fast manner on the combustion engine's output shaft 2a, and is shiftably arranged in an axial direction on the combustion engine's output shaft 2a. The clutch element 15 comprises a clutch section 15a, which is connectible with a clutch section 12b in the planetary wheel carrier 12. A schematically displayed shifting element 17 is adapted to shift the clutch element 15 between a first position where the clutch sections 15a, 12b are not in engagement with each other, corresponding to a release position in the first locking means, and a second position where the clutch sections 15a, 12b are in engagement with each other, corresponding to a locked position of the first locking means. In such locked position the combustion engine's output shaft 2a and the gearbox's input shaft 3a will be locked together and accordingly these and the electrical machine's rotor will rotate at the same engine speed. This state may be referred to as a locked planet. The locking mechanism may also advantageously have the design described in the Swedish patent application SE 536 559, and comprise a sleeve equipped with first splines, which engage, in the release position, with second splines on a first component of the planetary gear, and in the locked position, engage with third splines on a second component of the planetary gear. In this case the first component is preferably the planetary wheel carrier and the second component is the sun wheel. The locking mechanism may then be adapted like an annular sleeve, enclosing the planetary wheel carrier substantially concentrically. The locking means may also be made of a suitable type of friction clutch.

An electronic control device 18 is adapted to control the shifting element 17. The control device 18 is also adapted to determine the occasions on which the electrical machine should operate as an engine and the occasions on which it should operate as a generator. In order to so determine, the control device 18 may receive up to date information relating to suitable operating parameters. The control device 18 may be a computer with software for this purpose. The control device 18 controls a schematically displayed control equipment 19, which controls the flow of electric energy between a hybrid battery 20 and the stator windings 9a of the electrical machine. On occasions where the electrical machine 9 operates as an engine, stored electric energy is supplied from the hybrid battery 20 to the stator 9a. On occasions where the electrical machine operates as a generator electric energy is supplied from the stator 9a to the hybrid battery 20. The hybrid battery 20 delivers and stores electric energy with a voltage in the range of 300-900 Volt. Since the intermediate section 6 between the combustion engine 2 and the gearbox 3 in the vehicle is limited, the electrical machine 9 and the planetary gear must constitute a compact unit. The planetary gear's components 10, 11, 12 are arranged substantially radially inside the electrical machine's stator 9a. The rotor 9b of the electrical machine, the ring gear 11 of the planetary gear, the combustion engine's output shaft 2a and the input shaft 3a of the gearbox are here rotatably arranged around a common rotation axis 5. With such an embodiment the electrical machine 9 and the planetary gear occupy a relatively small area. The vehicle 1 is equipped with an engine control function 21 with which engine speed $n_1$ and/or torque of the combustion engine 2 may be controlled. The control device 18 accordingly has the possibility of activating the engine control function 21 and of creating a substantially zero torque state in the gearbox 3 at engagement and disengagement of gears in the gearbox 3. Naturally, the drive system may, instead of being controlled by one single control device 18, be controlled by several different control devices.

The part of a drive system of a vehicle, thus far described, and displayed at FIG. 2, on which a method according to the invention may be implemented is extant in the drive system according to SE 536 329. Below, a part of the drive system, which may be added to this part for the performance of the invention, will be described with reference to FIG. 3.

The drive system, specifically the intermediate section 6, also has a second electrical machine 30 with a stator 31, with stator windings and a rotor 32 which is connected with the combustion engine's output shaft 2a. A second locking means 33, which may have a similar design as the first locking means 34, illustrated in more detail in FIG. 2, is adapted to separate, in a release position, a first part 35 of the combustion engine's output shaft, arranged nearest the combustion engine, from a second part 36 thereof connected with the sun wheel 10 of the planetary gear, so that the second electrical machine's rotor 32 and the sun wheel 10 are allowed to rotate independently of the first section 35 of the combustion engine's output shaft. The second locking means may be moved to a locked position in which both the parts 35, 36 of the combustion engine's output shaft are locked together, and accordingly the first part 35 is locked together with the second electrical machine's rotor. The control device 18 is adapted to control fuel supply to the combustion engine 2 and to control exchange of electric energy between the first electrical machine 9 on the one hand, and the second electrical machine 30, and, on the other hand, electric energy storage devices such as batteries and electric auxiliary units and loads in the vehicle, such as servo control units, pumps, cooling aggregates and similar.

A range of positive features are achieved in the drive system through the added arrangement of the electrical machine 30 and the second locking means 33. If the vehicle is driven with the first locking means 34 in a locked position and for example the second locking means 33 in a locked position, and a request arises for shifting the first locking means 34 into a release position, the power unit configuration is controlled towards a torque balance between the components that are locked together, i.e. the planetary wheel carrier 12 and the sun wheel 10, via the first locking means 34. This may be achieved by controlling the first electrical machine 9 and at least one of the second electrical machine 30 and the combustion engine 2, since the second locking means 33 is in a locked position, towards said torque balance, so that there is also a possibility for energy storage in the hybrid battery 30 if desired. Here, torque balance is achieved when the following relation between the torques applied is met for the example configuration displayed in FIG. 3:

$$T_{sun\ wheel} = \frac{Z_s}{Z_r} T_{ring\ gear}$$

where $T_{sun\ wheel}$ and $T_{ring\ gear}$ represent the torque applied to the sun wheel and the ring gear, respectively, where $T_{sun\ wheel} = T_{ice} + T_{em2}$ and $T_{ring\ gear} = T_{em1}$ where $T_{ice}$ is torque applied to the combustion engine's output shaft $T_{em2}$ is torque applied via the second electrical machine's stator to its rotor $T_{em1}$ is torque applied via the first electrical machine's stator to its rotor, $Z_s$ is the number of teeth on the sun wheel, $Z_r$ is the number of teeth on the ring gear.

Accordingly, torque balance relates to the state where a torque acts on a ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1 minus the planetary gear's gear ratio). At such torque balance said first locking means 34 does not transfer any torque between the components of the planetary gear. Once torque balance has been achieved, the first locking means 34 may easily be moved to the release position, so that the planetary gear's components are no longer locked together.

Figure 3:
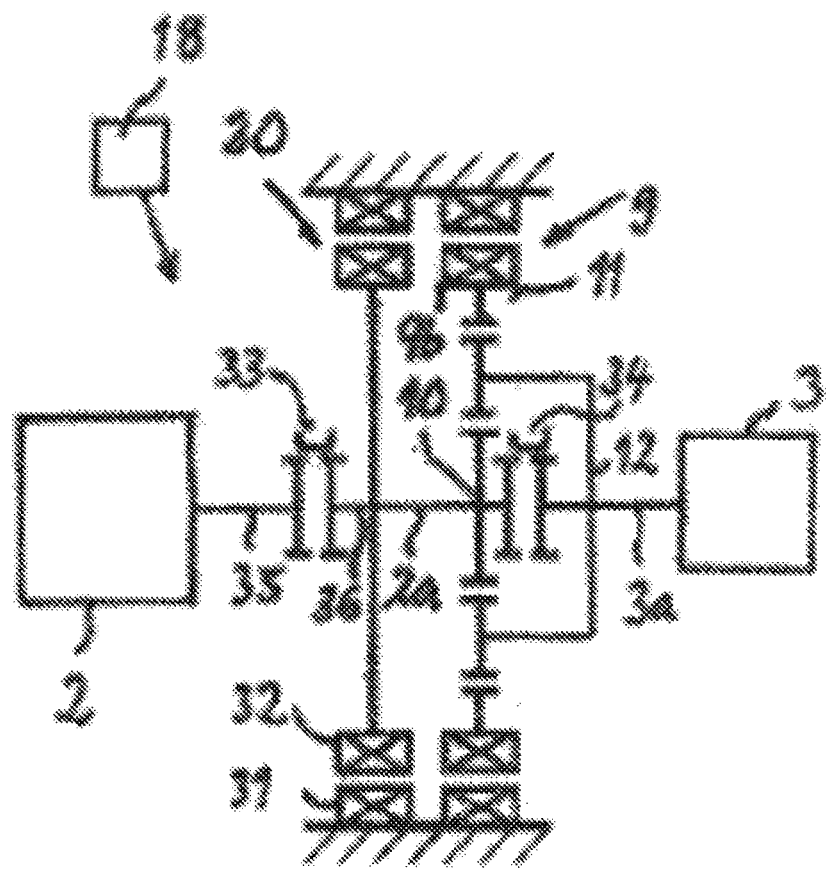
FIG. 3 is a simplified view, illustrating the general structure of a drive system in a vehicle, for which a method according to one embodiment of the invention is carried out.

A great advantage of a drive system according to FIG. 3, with or without the second locking means, which the present invention is focused on, is the potential for continuous electric power supply by electric units in all operating modes with the combustion engine connected in a steady state. This is normally not achieved with hybrid solutions having only one electrical machine. When the first locking means is in a locked position, said electric unit is supplied by substantially distributing the requested electrical power to the electric auxiliary units and the electric loads of the vehicle between the electrical machines. In this way, the losses in the electrical machines are minimized since the torque per electrical machine is halved compared to where an electrical machine had supplied all the electrical power. Since the loss effects of the electrical machines substantially scale against the torque applied squared, this entails substantially a halving of the losses of the electrical machines.

When the first locking means is open, the first electrical machine will determine the torque in the powertrain. The engine speed of the combustion engine is controlled to an operational point, which is selected by minimizing the losses of the combustion engine together with losses of the electrical machine and the inverter. The second electrical machine is then used to balance the power for potential energy storage means, electrical units and the first electrical machine. It is a great strength that the power supply of the electrical units may take place, even if the vehicle is not equipped with an electrical energy storage system. The supply may also take place continuously during all types of up- and down-shifts, during crawling, start-off and braking. All driving modes except electrical driving and brake regeneration, may be carried out without any electrical storage means or with a defective energy storage means. In operating modes, with or without a defective electrical energy storage, y the voltage of the second electrical machine normally will be controlled to maintain the correct voltage level on the DC-link (supply voltage to the two inverters connected to the stators of the electrical machines). It is also conceivable that the voltage of the first electrical machine may be controlled in some cases. Voltage control is a "mode" of the inverter where a voltage is requested from the inverter. The inverter then controls the electrical machine's torque so that the requested voltage is maintained on the inverter's supply side.

Figure 4:
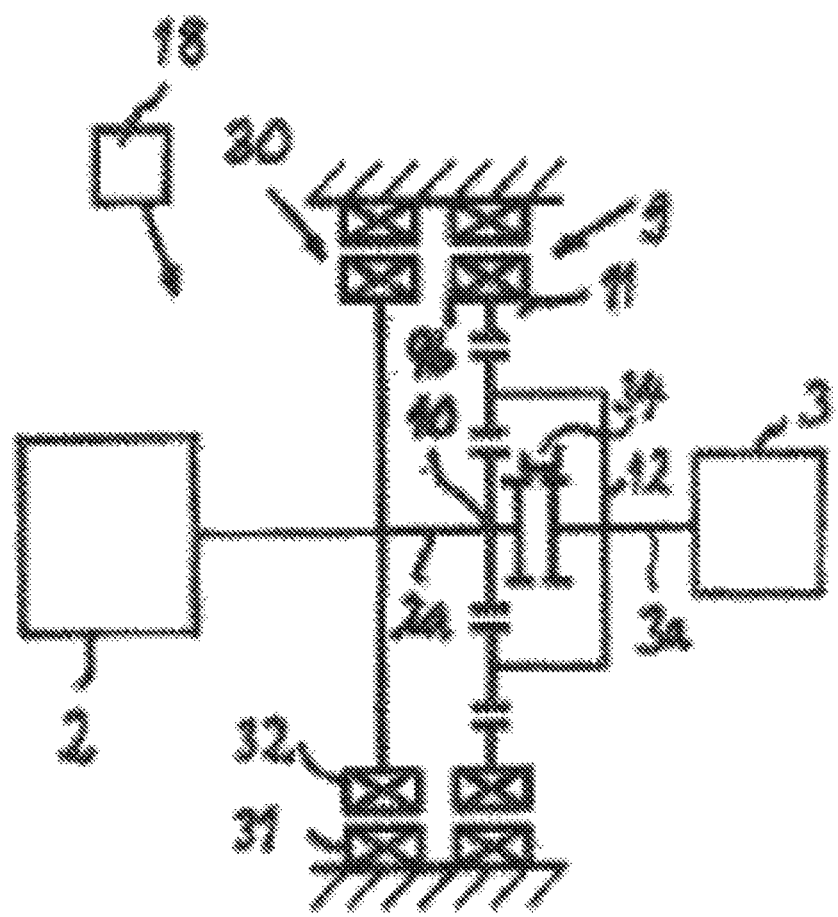
FIG. 4 is a simplified view, illustrating the general structure of another drive system in a vehicle, for which a method according to one embodiment of the invention is carried out.

FIG. 4 shows, in a simplified way, a drive system which differs from the one according to FIG. 3, since the combustion engine 2 is permanently connected with the second electrical machine's rotor 32. Embodiments of the inventive method may be carried out in vehicles with these alternative drive systems.

Figure 5:
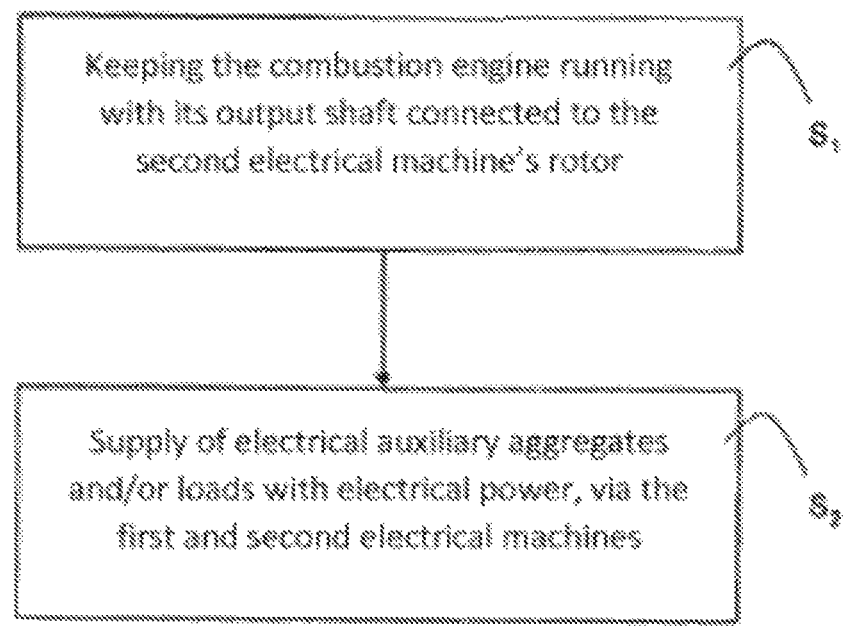
FIG. 5 is a flow chart showing a method according to one embodiment of the invention.

FIG. 5 illustrates a flow chart of a method according to one embodiment of the present invention, implemented in a vehicle with a drive system of the type displayed in FIGS. 3 and 4. At the performance of the inventive method for supplying electrical power to electrical auxiliary units and/or loads present in the vehicle, in a first method step $S_1$ the combustion engine is kept running with its output shaft connected with the second electrical machine's rotor. In a method step $S_2$ carried out in parallel, electrical auxiliary units and/or loads present in the vehicle are supplied with electrical power via the first and second electrical machines.

Computer program code for implementation of a method according to the invention is suitably included in a computer program which is loadable into the internal memory of a computer, such as the internal memory of an electronic control device of a vehicle. Such a computer program is suitably provided via a computer program product, comprising a data storage medium readable by an electronic control device, which data storage medium has the computer program stored thereon. Said data storage medium is e.g. an optical data storage medium in the form of a CD-ROM, a DVD, etc., a magnetic data storage medium in the form of a hard disk drive, a diskette, a cassette, etc., or a Flash memory or a ROM, PROM, EPROM or EEPROM type memory.

Figure 6:
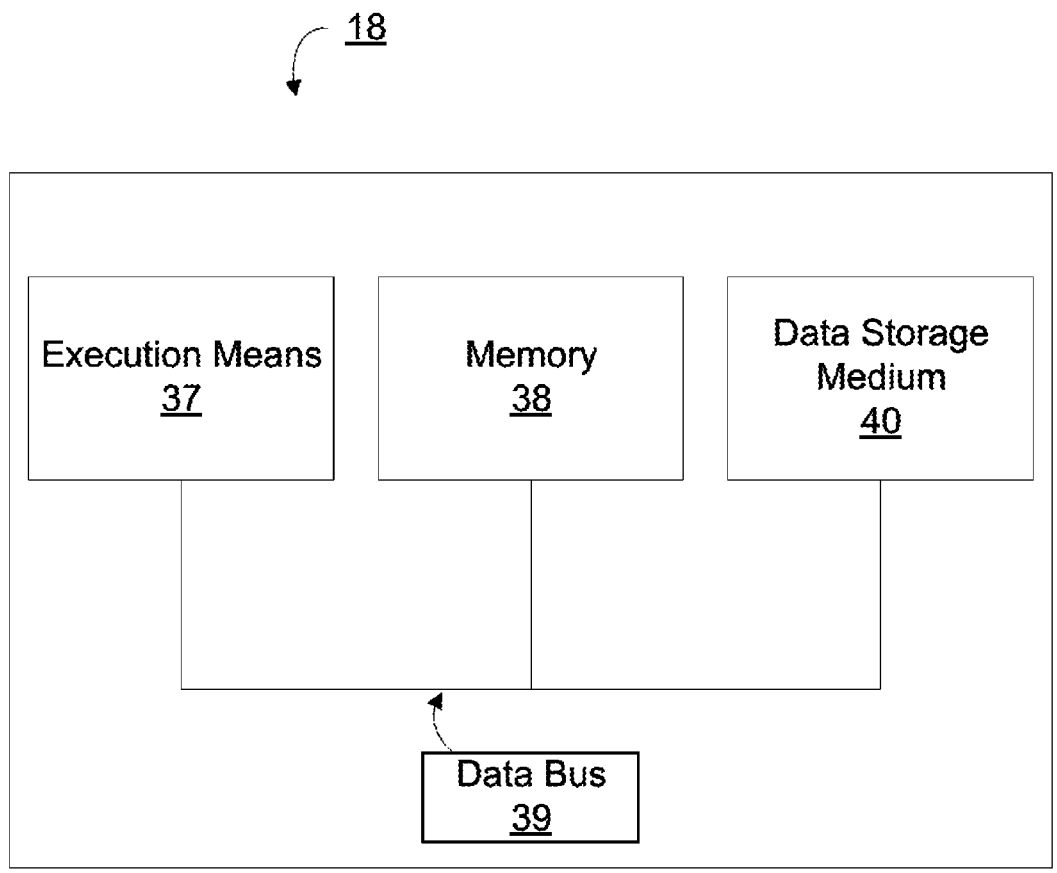
FIG. 6 is a fundamental diagram of an electronic control device for implementation of one or several methods according to the invention.

FIG. 6 very schematically illustrates an electronic control unit 18 comprising execution means 37, such as a central processor unit (CPU), for the execution of computer software. The execution means 37 communicates with a memory 38, e.g. a RAM memory, via a data bus 39. The control device 18 also comprises a durable data storage medium 40, e.g. in the form of a Flash memory or a ROM, PROM, EPROM or EEPROM type memory. The execution means 37 communicates with the data storage means 40 via the data bus 39. A computer program comprising computer program code for the implementation of a method according to the invention is stored on the data storage medium 40.

The invention is obviously not limited in any way to the embodiments described above, but numerous possible modifications thereof should be obvious to a person skilled in the area, without such person departing from the spirit of the invention as defined by the appended claims.

The inventive method could be carried out in a vehicle with a drive system, which has the planetary gear's ring gear as said first component and the sun wheel as said third component, which means that the first electrical machine's rotor would be connected with the planetary sun wheel and the second electrical machine's rotor and the combustion engine would be connected with the planetary gear's ring gear instead of with the sun wheel. Advantageously, however, the planetary gear's output shaft for transmission of torque for the vehicle's propulsion is connected with the planetary wheel carrier.

Nor is it necessary for the output shaft from the planetary gear to be an input shaft in a gearbox, instead the vehicle could have no gearbox.

The invention claimed is:

1. A method for control of a vehicle with a drive system comprising an output shaft in a combustion engine, a first electrical machine, comprising a stator and a rotor, a planetary gear comprising three components in the form of a sun wheel, a ring gear and a planetary wheel carrier, wherein the combustion engine's output shaft is connected with a first of said components in the planetary gear, so that a rotation of such shaft leads to a rotation of such first of said components, wherein an output shaft of the planetary gear is connected with a second of said components in the planetary gear, for transmission of torque for the vehicle's propulsion, so that a rotation of such shaft leads to a rotation of said second of said components, and the electrical machine's rotor is connected with a third of said components in the planetary gear, so that a rotation of the rotor leads to a rotation of such third of said components, wherein the drive system also comprises a first locking means which may be moved between a locked position, in which two of said components are locked together so that the three components rotate with the same rotational speed, and a release position in which the components are allowed to rotate at different rotational speeds, wherein the vehicle is controlled, whose drive system also comprises a second electrical machine with a stator and a rotor connected with the output shaft of the combustion engine between the combustion engine and said first of said components, and in that the method comprises the following steps in order to supply electrical auxiliary units and/or loads present in the vehicle with electrical power:

a) continuously running the combustion engine with its output shaft connected with the second electrical machine's rotor; and b) supplying said electrical auxiliary units and/or loads with electrical power via the first electrical machine and/or the second electrical machine.

2. The method according to claim 1, wherein the method is implemented with said first locking means in its locked position, and in supplying said electrical auxiliary units and/or loads with electrical power via the first electrical machine and/or the second electrical machine, said electrical auxiliary unit and/or loads are supplied with electrical power requested thereby, and distributed between the first and the second electrical machines in such proportions that the total power loss is minimized.

3. The method according to claim 1, wherein the method is implemented with said first locking means in its locked position, and in supplying said electrical auxiliary units and/or loads with electrical power via the first electrical machine and/or the second electrical machine, said electrical auxiliary units and/or loads are supplied with electrical power requested thereby, in substantially equal parts by the first and the second electrical machines.

4. The method according to claim 1, wherein the method is implemented with said first locking means in its release position, and in that it also comprises the following steps:

c) controlling the engine speed of the combustion engine to an operational point, selected by minimizing combustion engine losses together with losses in the electrical machines and losses in inverters, comprised in the vehicle's electrical systems for conversion of direct voltage to alternating voltage and vice versa;

d) controlling the second electrical machine for balancing of the electrical power transmitted to said electrical auxiliary unit and/or loads and the first electrical machine; and e) controlling the first electrical machine to achieve, throughout the progress of the entire method, a requested torque for transmission to said output shaft of the planetary gear, wherein controlling the engine speed, controlling the second electrical machine, and controlling the first electrical machine are carried out substantially in parallel.

5. The method according to claim 1, wherein a vehicle is controlled, which has a drive system which also comprises a second locking means, which may be moved between a locked position in which the combustion engine's output shaft is locked together with the second electrical machine's rotor and said first of said components, and a release position in which the combustion engine's output shaft is disconnected from the second electrical machine's rotor, and said first of said components is allowed to rotate independently of these, which are controlled, and in that the second locking means is in a locked position when the method is performed.

6. The method according to claim 1, wherein a vehicle is controlled, whose drive system also comprises at least one electric energy storage means for exchange of electrical power with the first and the second electrical machines and said electrical auxiliary units and/or loads.

7. The method according to claim 1, wherein supply of said electrical auxiliary unit and/or loads with electrical power is implemented in such a way that power balance is achieved, wherein free selection, within the limitations generally specified for the drive system, of charge current to, or discharge current from electric energy storage devices, and/or electric auxiliary units and/or loads occurs that may be present in the vehicle, occurs in accordance with the prevailing operational situation in the vehicle.

8. The method according to claim 7, wherein a maintenance of power balance is temporarily waived where needed, when said supply is carried out.

9. The method according to claim 1, wherein the method is implemented out in the vehicle with a said drive system, in which the planetary gear's sun wheel is said first of said components and its ring gear is said third of said components.

10. The method according to claim 1, wherein the method is carried out in a vehicle with a gearbox with an input shaft, which is connected with said output shaft of the planetary gear.

11. A computer program product comprising computer program code for supplying electrical auxiliary units and/or loads present in a vehicle with electrical power, wherein the vehicle comprises a drive system comprising an output shaft in a combustion engine, a first electrical machine, comprising a stator and a rotor, a planetary gear comprising three components in the form of a sun wheel, a ring gear and a planetary wheel carrier, wherein the combustion engine's output shaft is connected with a first of said components in the planetary gear, so that a rotation of such shaft leads to a rotation of such first of said components, wherein an output shaft of the planetary gear is connected with a second of said components in the planetary gear, for transmission of torque for the vehicle's propulsion, so that a rotation of such shaft leads to a rotation of such second of said components, and the electrical machine's rotor is connected with a third of said components in the planetary gear, so that a rotation of the rotor leads to a rotation of such third of said components, wherein the drive system also comprises a first locking means which may be moved between a locked position, in which two of said components are locked together so that the three components rotate with the same rotational speed, and a release position in which the components are allowed to rotate at different rotational speeds, wherein the vehicle is controlled, whose drive system also comprises a second electrical machine with a stator and a rotor connected with the output shaft of the combustion engine between the combustion engine and said first component, wherein the computer program product is stored in a non-transitory computer-readable medium and comprises computer-readable program code portions embodied therein, the computer-readable program code portions comprising computer code to cause an electronic processor to:

a) continuously run the combustion engine with its output shaft connected with the second electrical machine's rotor; and
b) supply said electrical auxiliary units and/or loads with electrical power via the first electrical machine and/or the second electrical machine.

12. An electronic control device for supplying electrical auxiliary units and/or loads present in a vehicle with electrical power,
wherein the vehicle comprises a drive system comprising an output shaft in a combustion engine, a first electrical machine, comprising a stator and a rotor, a planetary gear comprising three components in the form of a sun wheel, a ring gear and a planetary wheel carrier, wherein the combustion engine's output shaft is connected with a first of said components in the planetary gear, so that a rotation of such shaft leads to a rotation of such first of said components, wherein an output shaft of the planetary gear is connected with a second of said components in the planetary gear, for transmission of torque for the vehicle's propulsion, so that a rotation of such shaft leads to a rotation of such second of said components, and the electrical machine's rotor is connected with a third of said components in the planetary gear, so that a rotation of the rotor leads to a rotation of such third of said components, wherein the drive system also comprises a first locking means which may be moved between a locked position, in which two of said components are locked together so that the three components rotate with the same rotational speed, and a release position in which the components are allowed to rotate at different rotational speeds, wherein the vehicle is controlled, whose drive system also comprises a second electrical machine with a stator and a rotor connected with the output shaft of the combustion engine between the combustion engine and said first component,
wherein said electronic device comprises:
a storage device;
an electronic processor operatively coupled to the storage device; and
a computer program product stored in a non-transitory computer-readable medium on the storage device and comprising computer-readable program code portions embodied therein, the computer-readable program code portions comprising computer code to cause an electronic processor to:
a) continuously run the combustion engine with its output shaft connected with the second electrical machine's rotor; and
b) supply said electrical auxiliary units and/or loads with electrical power via the first electrical machine and/or the second electrical machine.

* * * * *